United States Patent

[11] 3,629,700

[72] Inventors Stanley A. Yalof
Rte. 1, Box 720, Escondido, Calif. 92025;
Lawrence Van Doren, 5119 Arlene Place,
San Diego, Calif. 92117
[21] Appl. No. 858,266
[22] Filed Sept. 16, 1969
[45] Patented Dec. 21, 1971

[54] CAPACITANCE AND DISSIPATION FACTOR MEASURING APPARATUS HAVING COHERENT DETECTORS
5 Claims, 1 Drawing Fig.

[52] U.S. Cl. .................................................. 324/60 R
[51] Int. Cl. .................................................. G01r 11/52
[50] Field of Search .......................................... 324/60

[56] References Cited
UNITED STATES PATENTS
3,026,474   3/1962   Pihl ............................... 324/60

Primary Examiner—Edward E. Kubasiewicz
Attorney—Richard K. MacNeill

ABSTRACT: A dielectric meter for measuring electrical characteristics of a dielectric sample having resistive and capacitive components in which a variable-frequency oscillator has a sine wave output coupled through an integrator with a 1-watt transfer characteristic into a sample; the output of the sample being coupled through an operational amplifier to the input of a first coherent detector and through a limiter to the input of a second coherent detector; the first coherent detector having a reference input comprising an inphase square wave signal from the variable-frequency oscillator and the second coherent detector having a reference input comprising a quadrature square wave signal output coupled from the variable-frequency oscillator; the output of the first coherent detector having an amplitude directly proportional to the capacitor component of the sample and the output of the second coherent detector being passed through a tangent function generator yielding a loss tangent dissipation factor.

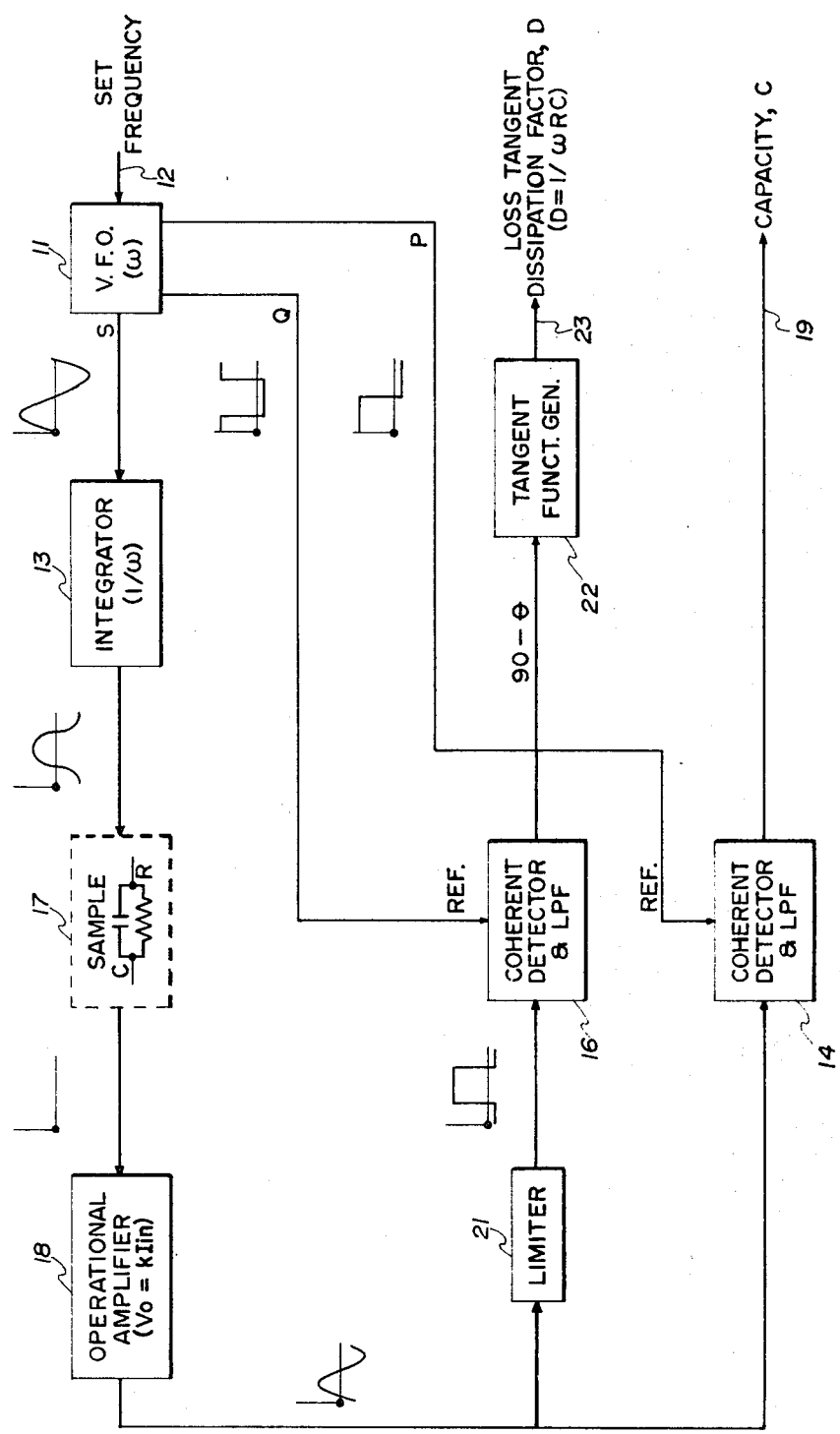

3,629,700

CAPACITANCE AND DISSIPATION FACTOR MEASURING APPARATUS HAVING COHERENT DETECTORS

BRIEF DESCRIPTION OF THE INVENTION

The present invention relates to a dielectric meter and more particularly to a dielectric meter yielding a signal proportional to the capacity of a sample dielectric and a second output yielding a signal proportional to a loss tangent dissipation factor.

According to the invention, a variable-frequency oscillator has a sine wave output coupled through an integrator yielding a 90° phase shift and a 1-watt transfer characteristic. The output of the integrator is coupled to an input of a sample dielectric material, such as a polyester resin. The variable-frequency oscillator is set for an optimum frequency according to the impedance characteristics of the particular sample being tested. An output is taken from the sample dielectric through an operational amplifier which will be complex in nature, i.e., the result of reactive and resistive components in the sample and is coupled through a coherent detector which has a reference from the variable-frequency oscillator to yield a signal having an amplitude varying directly with capacity component of the sample. This is possible due to the fact that the reactance of the sample will vary inversely with frequency while the integrator transfer characteristic has an attenuation varying inversely with frequency which directly compensate each other for variations in frequency. A second output is taken from the operational amplifier through a limiter and a second coherent detector which has a quadrature reference from the variable-frequency oscillator which would, without the limiter, yield an output corresponding to the phase shift of the signal through the sample. However, by limiting or squaring the input to the second coherent detector, its output will have an amplitude corresponding to the phase shift of the signal through the sample. The quadrature reference is necessary due to the quadrature shift through the integrator resulting in an inphase signal. The output of the second coherent detector is passed through a tangent function generator which yields a signal proportional to the loss tangent dissipation factor. The term dielectrometer as utilized in this application is defined as an instrument which meters electrical parameters of a sample dielectric material.

An object of the present invention is the provision of a dielectrometer which meters the loss tangent dissipation factor and capacity of a sample dielectric material.

Another object is the provision of a dielectrometer in which a signal frequency can be varied for the optimum transfer characteristics of the dielectric being metered without effecting the output readings.

A further object of the invention is the provision of a dielectrometer which utilizes standard components and requires a minimum of maintenance and adjustment.

Other objects and many of the attendant advantages of this invention will be readily appreciates as the same becomes better understood by reference to the following detailed description when considered in connection with the accompanying drawings in which like reference numerals designate like parts throughout the FIGS. thereof and wherein:

The sole FIGURE represents in block diagram form the preferred embodiment of the present invention.

DETAILED DESCRIPTION OF THE DRAWING

Referring to the drawing, variable-frequency oscillator 11 has a set frequency input 12 and one output coupled to integrator 13, a second output connected to a reference input of coherent detector 14, a third output connected to a reference input of coherent detector 16. The output of integrator 13 is coupled through sample 17 to the input of operational amplifier 18. The output of operational amplifier 18 is coupled to a signal input of coherent detector 14. The output of coherent detector 14 is coupled to a capacity output terminal 19. The output of operational amplifier 18 is also coupled through limiter 21 to a signal input of coherent detector 16, the output of which is coupled through tangent function generator 22 to a loss tangent dissipation factor output terminal 23.

OPERATION

A typical use for the present invention is the monitoring of sample polyester resin compression moldings for proper curing since the electrical transfer characteristic of the resin, as a dielectric, will vary with its curing. Accordingly, a variable-frequency oscillator is utilized to optimize the metering of the sample since variations of the dielectric will vary the frequency transfer curve. Hence, variable-frequency oscillator is set at something near the optimum transfer frequency of the sample and has a sine wave output which is integrated in integrator 13. Integrator 13 shifts the sine wave signal 90° and utilizes a transfer characteristic of 1 w. or one-half ¶f. Hence, the reactive component of the sample 17, having a frequency which would transfer the signal directly proportional to the frequency, will be offset by the integrator 13 attenuating the signal inversely proportional to the frequency rendering the entire dielectrometer insensitive to frequency changes, i.e., automatically compensating for frequency.

A quadrature square wave output is also taken from variable-frequency oscillator 11 and applied to a reference input of coherent detector 16 which also incorporates a low-pass filter. An inphase square wave signal is taken from the variable-frequency oscillator 11 and coupled to the reference input of coherent detector 14, which also incorporates a low-pass pass filter. It is pointed out here, that the waveforms appearing throughout the diagram correspond to voltage waveforms, hence, the sine-wave output from the vairable frequency oscillator 11 appears as an 0° phase waveform and the output of integrator 13 a 90° shifted waveform. Since the output of sample 17 is converted to current by the low input impedance of the operational amplifier 18, it does not appear as a voltage waveform. The output of operational amplifier 18 is then the result of a complex impedance represented by a capacitor and resistive network in sample 17 and is somewhere between 0° and 90° phase with respect to the original 0° phase output of variable-frequency oscillator 11. To measure this phase shift, this signal is limited in limiter 21 and appears as a square wave at the input of coherent detector 16. Since the reference from variable-frequency oscillator 11 is in quadrature to the original sine-wave signal of variable-frequency oscillator 11, it will be in phase with the output of integrator 13 and the output of coherent detector 16 will appear as a voltage proportional to the phase shift of the signal passing through sample 17. This signal is then passed through a tangent function generator 22, which yields a signal directly proportional to a loss tangent dissipation factor which is expressed mathematically as D 1 w. RC, which is also equal to the tangent of 90 minus the phase shift of the signal passing through the sample.

A second signal is passed into the input of coherent detector 16 which, again, is the complex output of operational amplifier 18. This signal is referenced with a square wave which is inphase with the sine-wave output of variable frequency oscillator 11 and, hence, in quadrature with the input to sample 17. The result is a signal and output terminal 21 which has an amplitude directly proportional to the capacitive component of sample 17.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

We claim:
1. A dielectrometer for measuring electrical characteristics of a dielectric sample comprising:
   a signal generator having a sine-wave output and a square wave output 90° removed in phase from said sine-wave output;

a dielectric sample having an input coupled to said sine-wave output;

limiting means, said limiting means having an input coupled to an output from said dielectric sample;

a coherent detector, said square wave output coupled to a reference input of said coherent detector and a signal input of said coherent detector coupled to an output of said limiter; and tangent function generator means having an input coupled to an output of said coherent detector whereby an output from said tangent function generating means yields the dissipation factor of said dielectric sample.

2. The dielectrometer of claim 1 wherein:

said signal generator comprises a variable-frequency oscillator and further includes integrating means coupled between said sine-wave output and said dieletric sample input.

3. The dielectrometer of claim 2 and further including:

a second square wave output of said signal-generating means in phase with said sine-wave output; and a second coherent detector having a reference input coupled to said second square wave output and a signal input coupled to an output of said dielectric sample whereby an output from said second coherent detector yields the capacitive component of said dielectric sample.

4. The dielectrometer of claim 1 and further including:

integrating means coupled between said sine-wave output and said dielectric sample; and an operational amplifier coupled between said dielectric sample output and said limiting means.

5. A dielectrometer for measuring electrical characteristics of a dielectric sample comprising:

a dielectric sample having an input and an output;

a signal-generating means having a signal output coupled to said dielectric sample input;

a coherent detector having a signal input and a reference input;

coupling means coupling the output of said dielectric sample to said signal input; and said signal-generating means operable for generating a reference signal of the same frequency and predeterminedly related in phase to said signal output, said reference signal being coupled to said coherent detector reference input whereby the output of the coherent detector is the arctangent of the dissipation factor of the dielectric sample.

* * * * *